United States Patent Office 2,754,545
Patented July 17, 1956

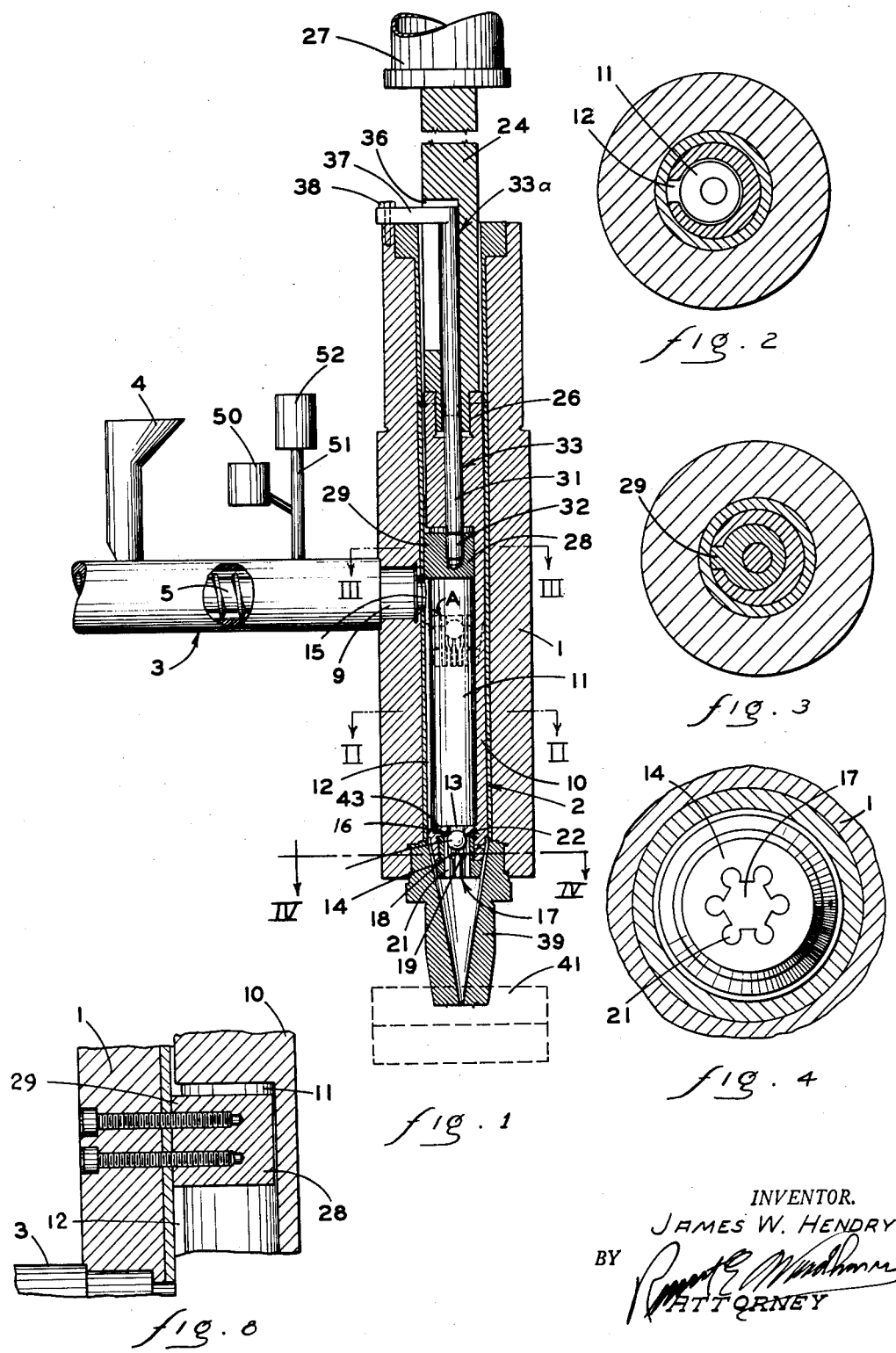

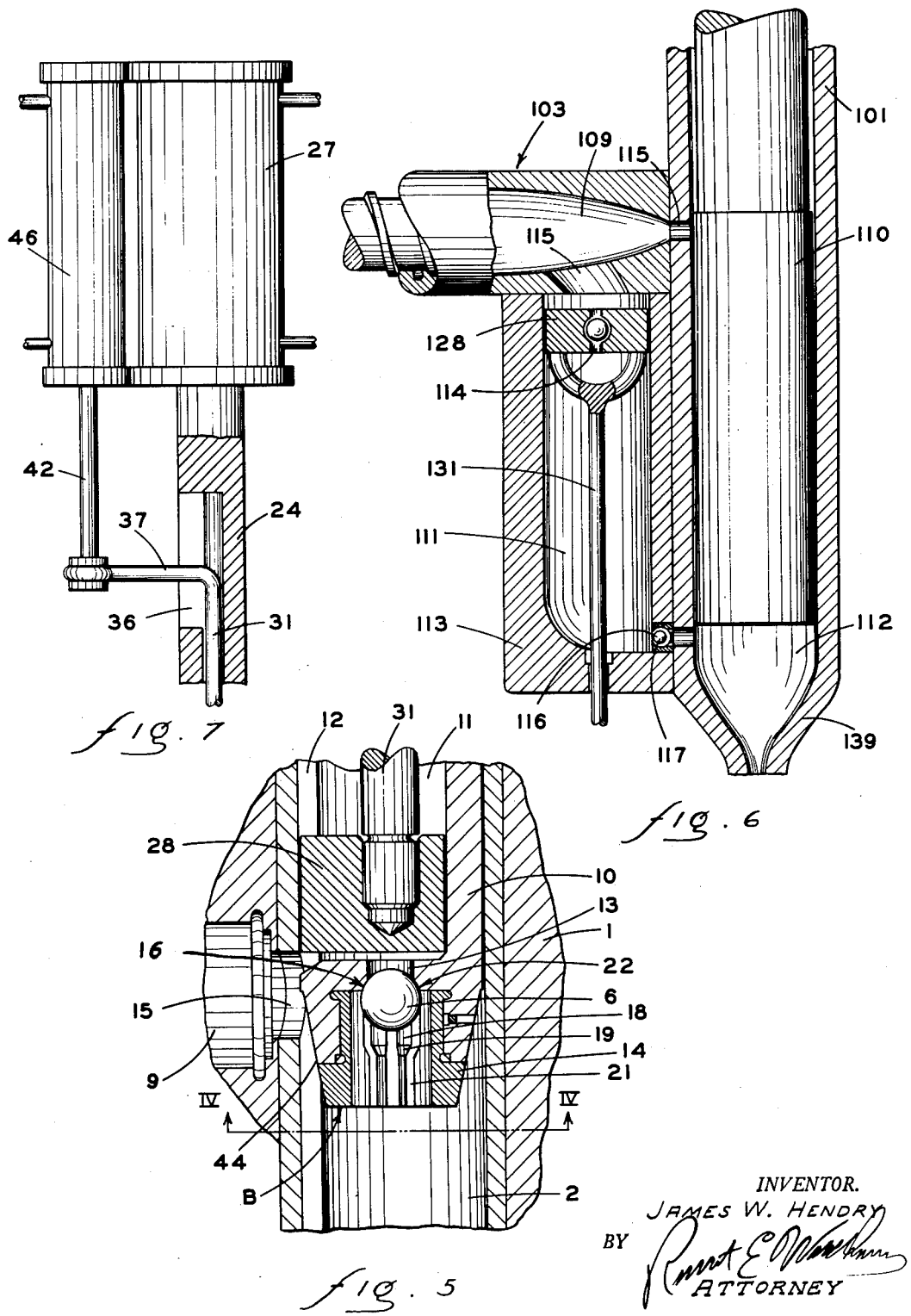

2,754,545
INJECTION MACHINE

James W. Hendry, Bay City, Mich., assignor, by mesne assignments, to Tube Turns Plastics, Inc., Louisville, Ky., a corporation of Delaware Application January 4, 1952, Serial No. 264,949

8 Claims. (Cl. 18—30)

This invention relates to a plastic molding machine of the pre-plasticizing injection type and particularly to one providing for continuous operation of a pre-plasticizing unit in connection therewith.

In presently known plastic injection machines wherein a pre-plasticizing unit is utilized in connection therewith, there has normally been utilized a pre-plasticizing unit operating intermittently by which said pre-plasticizing unit would fill the ram chamber when the ram is retracted and would then stop while the ram operated to drive plastic material into the mold. This has operated efficiently and satisfactorily but the starting and stopping of the screw conveyor, which has normally been utilized in such a pre-plasticizing unit, presents certain requirements of both control and power supply which have been expensive and complex to handle. Particularly, these problems have arisen in connection with the provision of the necessary timing equipment, speed control equipment and adequate power supply for the pre-plasticizing screw. The timing and speed control equipment is available and is in successful operation in machines of this general type, but it is expensive, often bulky in size, and is frequently a source of shut-down time and expense in maintenance. The power supply may constitute either a motor capable of starting under high load or clutching equipment capable of connecting a screw with a continuously operating motor. However, whenever the screw is operating intermittently, the starting load on the screw is much greater than the load after the screw has started, or when the screw is operating continuously. Hence, the provision of a continuously operating screw would greatly reduce the size of the prime mover required for a given size of machine and the size of the clutch also needed wherever a clutch is used.

Further, a serious problem in this type of equipment is the control of the heat supplied to the plastic material within the pre-plasticizing unit. Where the screw operates intermittently, or at varying speeds, much of the difficulty in controlling the heating and cooling of the plastic material within the pre-plasticizing unit originates in the changing heating conditions incident to changing the speed of rotation of the screw. Therefore, if it is possible to eliminate, or at least diminish, the frequency and magnitude of such speed changes, the problems of controlling such heating diminish materially. This is true whether the heat is supplied from external sources or whether the heat originates in whole or in part as frictional heat due to the working of the plastic by the screw.

Accordingly, a principal object of the invention has been to provide a plastic injection machine of the pre-plasticizing type wherein the pre-plasticizing unit is enabled to operate for periods of time greater than those periods in which the ram chamber is in condition to receive plasticized plastic material.

A further object of the invention has been to provide a plastic injection machine of the pre-plasticizing type wherein the pre-plasticizing unit is enabled to operate continuously.

A further object of the invention has been to provide a machine, as aforesaid, wherein means are provided for receiving the output of a pre-plasticizing device, for accumulating same during both the injection stroke of the injection ram and during the holding period of the injection ram and subsequently to deliver said plastic material into the ram chamber.

A further object of the invention has been to provide a machine, as aforesaid, wherein said accumulated plasticized plastic material may be delivered into said ram chamber simultaneously with the delivery thereinto of material being discharged from a pre-plasticizing device.

A further object of the invention is to provide a machine, as aforesaid, wherein the frequency and magnitude of speed changes in the pre-plasticizing screw may be materially diminished as compared to present practice.

A further object of the invention is to provide a machine, as aforesaid, wherein the means accumulating said plastic material comprises an auxiliary chamber or reservoir.

A further object of the invention has been to provide a device, as aforesaid, wherein the motion of the injection ram as same retracts after an injection stroke may be utilized for ejecting plastic material from the auxiliary chamber.

A further object of the invention has been to provide a plastic injection machine, as aforesaid, wherein said auxiliary chamber is located in the injection ram.

A further object of the invention has been to provide a device, as aforesaid, having minimum number of parts.

A further object of the invention has been to provide a device, as aforesaid, having relatively sturdy and simple parts and having a minimum number of external controls.

A further object of the invention has been to provide a device, as aforesaid, requiring relatively little maintenance.

Other objects and purposes of the invention will become apparent to persons acquainted with equipment of this general type upon reading the following specification and inspection of the accompanying drawings.

General description

In carrying out the objectives of my invention I provide a reservoir in close proximity to the ram chamber and preferably within the ram chamber, and I then provide means by which the pre-plasticizing unit is enabled to discharge into said reservoir whenever it is not feasible or desirable for it to discharge directly into the ram chamber, together with means by which the contents of said reservoir may be discharged into said ram chamber without necessarily stopping the pre-plasticizing screw in whatever part of the operating cycle it is convenient to receive pre-plasticized plastic material into said ram chamber.

More specifically, and referring particularly to the preferred embodiment of my invention herein utilized to illustrate same, I contemplate providing a reservoir within the ram which reservoir communicates through the working end of said ram past a suitable valve, as a check valve, into said ram chamber and it also communicates through the side of said ram continuously with the discharge port of the pre-plasticizing unit. Thus, when the ram is retracting and when it is in one retracted position, pre-plasticized material will pass from the pre-plasticizing unit into and through said reservoir and through the check valve into the ram chamber. During an injection stroke said check valve will hold the material in the ram chamber from passing back into the reservoir and the injection of said plastic material will take place in the usual manner. In the meanwhile, pre-plasticized material from the pre-plasticizing unit may continue to be received into said reservoir. This same condition and operation may continue while the ram is in its fully extended position and holding pressure on the plastic material within the mold while said plastic material is hardening. During the retraction movement of said ram a desired quantity of plastic material within said reservoir will flow through said check valve into said ram chamber. Supplying of plastic material to said ram chamber may then be continued to the desired extent when and while the ram is in a retracted position.

In this way the pre-plasticizing unit is, if desired, enabled to operate continuously, thus eliminating a great number of the controls which are now required to start and stop the screw in the pre-plasticizing unit and which are the source of much of the maintenance problems in present types of pre-plasticizing injection machines. Further, by permitting the pre-plasticizing unit to operate continuously, much of the temperature control problems incident to machines having intermittent pre-plasticizing operation are eliminated. Also, by having the pre-plasticizing unit operate continuously, both it and the prime mover driving same needs to be of much less size to deliver a given amount of plastic in a predetermined unit of time than is now required for the intermittently operating machines where the pre-plasticizing unit is delivering material for only a fraction, as 1/3 or 1/2, of the time required for an entire cycle. It will be recognized that this elimination of complex controls and the consequent reduction in size of both the pre-plasticizing unit and of the prime mover for operating same, will provide an exceedingly great reduction in both the initial cost of the injection machine and in its operating and maintainence costs.

Alternatively, if for any reason it is not desired to operate this screw continuously, it is still possible to operate it for periods longer than those periods during which it is possible to convey plastic material into the ram chamber and hence certain of the above named objectives, particularly, shortening of the operating cycle of a given machine, may still be accomplished.

*Detailed description*

In the figures:

Figure 1 is a view partially in central section and partially in fragmentary, broken elevation of a preferred form of my invention.

Figure 2 is a section taken on line II—II of Figure 1.

Figure 3 is a section taken on line III—III of Figure 1.

Figure 4 is a section taken on line IV—IV of Figure 1.

Figure 5 is a fragmentary view showing a part of the structure shown in Figure 1 in a different operating position and on an enlarged scale.

Figure 6 is a broken elevation view, partially in central section and partially in fragmentary, of a modification of the invention.

Figure 7 is a broken elevation view, partially in central section and partially in fragmentary, of a further modification of the invention.

Figure 8 is a fragmentary view in central section of a still further medification of the invention with the ram in the position of Figure 1.

In the following description the terms "upper" and "lower" will refer to parts and directions wherein "upper" refers to parts or directions toward the upper end of the sheet of drawings on which Figure 1 appears and the term "lower" or "downward" refers to parts or directions toward the bottom of the said sheet.

The terms "right" and "left," or derivatives thereof, refer to the right or left sides of the sheet on which Figure 1 appears. Inasmuch as the machine itself may operate as a downwardly ejecting machine, an upwardly ejecting machine, or may operate at any angle therebetween and particularly including horizontally, it will be recognized that these directional designations are arbitrary and are utilized solely for the purpose of convenience in reference and carry no further meaning.

Referring now to Figure 1, there is shown a housing 1 defining a ram chamber 2 of any convenient type as illustrated and described in more detail in either of my applications Serial No. 93,935, now Patent No. 2,705,342, issued April 5, 1955, or Serial No. 254,113, now Patent No. 2,705,343, issued April 5, 1955. Associated with said housing is a pre-plasticizing unit 3 having a hopper 4 for the supplying of raw plastic material to the interior of said preplasticizing unit and having also a screw 5 for the combined purposes of working, turning and agitating said plastic material and simultaneously conveying same into said ram chamber as hereinafter described. The details of said ram chamber may be as described as in my Patent 2,705,342, and the details of the screw therein may be, but are not confined to, the disclosures of my applications Serial No. 93,935 (now Patent No. 2,705,342), Serial No. 241,577 and Serial No. 236,803.

The manner of mounting said housing 1 and the pre-plasticizing unit 3 onto a suitable base may be handled in any convenient manner, such as, for example, that which is disclosed in either my Patent No. 2,705,342 or my Patent No. 2,564,203. Likewise, the manner of mounting mold holding platens with respect to the ejection nozzle from said ram chamber may be in any of several known forms, such as set forth in either of my last two named applications.

Still other details of construction, excepting as described otherwise hereinafter, such as means for reciprocating the ram cylinder, means for heating the pre-plasticizing unit and means for opening and closing molds, may all be of any conventional form, such as, by way of example, as illustrated in either of my Patents No. 2,705,342 or 2,705,343. Further, the structure herein described may be built as an independent machine or it may be built to replace the plasticizing and injection parts, but utilizing the other parts, of present conventional machines.

A ram 10 is reciprocably positioned within the ram chamber 2. In a preferred embodiment, a reservoir 11 is located within said ram and near the lower end thereof which reservoir is substantially co-axial with respect to the axis of said ram but for design reasons is preferably positioned slightly eccentric with respect thereto. A slot 12 extends through the side of said ram to provide communication from said reservoir throughout the full length thereof to the exterior of said ram. A passageway 13 is provided through the lower, or working, end of the ram and a valve fitting 14 is fitted in cooperation therewith for the double purpose of holding in place a valve 16, as a check valve, and for providing a working face for said ram. A central opening 17 (Figure 4) extends through said valve fitting, has an enlarged portion 18 therewithin defining seats 19 to limit the downward movement of the ball 6. The passageways 21 provide means for the conduction of plastic material past said ball 6 when same is in its lowermost position and on said seats. The lower end of the passageway 13 is provided with a seal 22 against which the ball 6 rests when same is in its uppermost position. While this is a preferred embodiment of the valve structure, it will be appreciated that any other form of valve, either check valve or positively operated valve, will be acceptable which will permit plastic material to flow from the reservoir 11 downwardly out therefrom but will prevent flow in the reverse direction.

Said ram is reciprocated by a rod 24 which is connected to the ram in any convenient manner as by threading at 26. Said rod is received within a hydraulic cylinder 27 for reciprocation in the usual manner.

A reservoir plunger 28 is located within the reservoir 11 and is provided with a guide 29 at one side thereof which is snugly but slidably received into the slot 12 for purposes appearing hereinafter. The piston rod 31 is connected to the reservoir plunger 28 in any convenient manner as by threading at 32, and extends through openings 33 and 33a in the ram and ram connecting rod respectively. In a portion of the ram connecting rod 24 which extends outwardly from the housing 1 there is provided a slot 36 of length substantially equal to the stroke of the injection ram. An arm 37 connects to the reservoir plunger rod 31 and extends outwardly through said slot 36 and is fastened in any convenient manner, as by a stud bolt 38, to the upper end of said housing to hold same immovably with respect to said housing.

A nozzle 39 of any conventional form is fastened to the lower end of the housing 1 in communication with the ram chamber 2 and communicates at its lower end with a mold of conventional form indicated by the broken lines at 41.

Where desired, attractive mottled or streaked effects may be obtained in a machine of this type by supplying coloring material from any convenient chamber 50 to an injection pipe 51 operating under pressure creating means 52 by which said coloring material is introduced into the plasticized material shortly prior to its delivery into the ram chamber. Inasmuch as the screw will, at this point, have had insufficient opportunity to thoroughly mix the coloring material into the plastic material, highly attractive mottled or streaked effects can be obtained.

By moving said pipe 51 further back away from the point of discharge from said pre-plasticizing unit 3, whereby a complete, or more nearly complete, mixing may be obtained, progressively more uniform color effects may be obtained. If said pipe 51 is moved sufficiently far back from the discharge point of the pre-plasticizing unit 3, it will sometimes be advantageous to utilize it for the injection into the plastic material of plasticizing or compounding materials, particularly in the case of handling rubber.

*Operation*

Raw plastic material is introduced into the hopper 4 and is worked and plasticized in the pre-plasticizing unit in the manner already set forth in detail in my Patent No. 2,705,342. The plasticizing screw 5, in a preferred embodiment, operates continuously from a suitable source of power (not shown) so that pre-plasticized material is discharged in a continuous and steady stream through the opening 9 in the side of the housing 1. Said material, preferably, is in any position of the ram 10 received through the slot 12 into the reservoir 11.

Starting with the apparatus in the position shown in Figure 1, that is, with the ram in its fully downwardly extended position, the screw 5 will force plasticized material into said reservoir 11 at a continuous and steady rate. As soon as the plastic material then in the mold from the previous stroke of the ram has hardened sufficiently that it is no longer necessary to maintain pressure by the ram 10 onto the material in the mold 41, said ram will be retracted in the usual manner. As said ram retracts, the reservoir plunger 28 remaining in the same position with respect to the housing 1 as it is when said ram is in its full downward position, said reservoir plunger 28 and the lower end 43 of the reservoir 11 will came towards each other and exert pressure on the plastic material within said reservoir. As the pressure on said plastic material within said reservoir increases, it will be forced out through the pasageway 13 and past the check valve 16 into the ram chamber 2 below the ram 10. When said ram 10 reaches its full upward position, it will occupy the position shown in broken lines at A in Figure 1 and plastic material may, if necessary to fill the ram chamber, continue to flow through slot 12, into said auxiliary chamber and past said check valve into the ram chamber. As soon as the ram chamber is filled with plastic material, which condition is preferably determined by a pressure responsive switch reactive to the pressure within the ram chamber, such as described in detail in Patent No. 2,705,343, the ram 10 is caused to move downwardly. As said ram moves downwardly the check valve 16 moves against its seat 22 and the plastic material in the ram chamber 2 is pushed downwardly and through the nozzle 39 into the mold 41 in the usual manner. As said ram moves downwardly, the continuously running screw 5 continues to fill the auxiliary chamber 11 with further plasticized material in preparation for the next cycle of operation.

It will be appreciated that, while in the above described cycle of operation it was assumed that the ram 10 would move upwardly only a distance such that the screw 5 would feed plasticized material continuously into the reservoir 11, it is equally possible, and in some instances it will be preferable, to move said ram back to a point shown at B in Figure 5 so that said plasticized material will pass between the tapered surface 44 of the ram and thus pass directly from the pre-plasticizing unit 3 into the ram chamber 2. By thus causing the ram to move backwardly somewhat further than is shown in Figure 1, a slightly greater capacity is obtained for a given piece of equipment. Inasmuch as the passageway 9 is not blocked for any appreciable period of time, if at all, this will not materially affect the operation of the pre-plasticizing unit nor the supplying by it of plasticized material to the ram chamber.

As the guide 29 travels from one end of the slot 12 to the other end thereof it will keep said slot clear of plastic material which might otherwise accumulate therein and thus the passageway from the pre-plasticizing unit 3 into the auxiliary chamber 11 will never be appreciably diminished.

While in the foregoing description, it has been assumed that the preplasticizing screw would operate continuously, and one of the major advantages of the apparatus herein described is that the pre-plasticizing screw is enabled to operate continuously, it is nevertheless true that some of the objectives of the invention will be attained even though the pre-plasticizing screw is operated intermittently, for with the said screw operating intermittently, and yet being enable by this construction to run for periods of time longer than those for which the opening 15 is uncovered by the ram in its fully retracted position, the cycle of operation is shortened over that which is necessary when the screw is enabled to operate only when said opening is uncovered as in constructions such as shown in United States Patents No. 2,359,840 and No. 2,561,595, and corresponding increase in operating speed is obtained.

Hence, although much of the foregoing description and statement of objectives have been set forth in terms of securing a continuously operating screw, it should be recognized that this does not entirely preclude the attainment of certain advantages by the present invention when the screw is run intermittently. Further, it will be recognized that if for any reason continuous operation of said screw at a uniform speed is not desired, it will be possible to operate said screw at two or more speeds with or without periods of complete stopping and still attain some of the advantages as above set forth for this invention.

*Modifications*

In the foregoing embodiment of the invention it has been assumed that the reservoir plunger 28 remains in fixed position with respect to the housing 1 by virtue of the arm 37. However, in some instances it will be found desirable to move said reservoir plunger for at least limited distances with respect to the housing 1. In this manner said plunger may be caused to place pressure on the plastic material within the reservoir chamber and the ram chamber after said ram is substantially fully retracted, as into position A shown in Figure 1, and it will thereby become possible to minimize the vacuum voids which might otherwise form from the plastic material in the ram chamber. This may be accomplished in a variety of ways of which one possible one is illustrated in Figure 7. Here the arm 37, instead of being bolted to the housing 1 is affixed to the plunger 42 (Figure 7) of an auxiliary hydraulic cylinder 46 which is caused to operate independently of the main hydraulic cylinder 27. In this way, the reservoir plunger 28 may be caused to move in any timed relationship with respect to the ram 10 for the purposes above named.

Figure 6 shows a further modified machine wherein certain of the advantages above set forth may be obtained but involving a somewhat different construction. In this apparatus the reservoir is placed outside of the ram but functions between the pre-plasticizing unit and the ram chamber in substantially the same manner as is accomplished in the form shown in Figure 1. In this embodiment, the general organization is the same as that above described with respect to Figure 1. The housing 101 contains a ram chamber 112 wherein operates a ram 110 controllably reciprocated by any conventional means. Pre-plasticizing means 103 communicates with said ram chamber through the opening 109. A reservoir 111 is defined by a housing 113 and has a passageway 115 leading thereinto from the opening 109. A further passageway 116 leads from the lower end of said reservoir 111 into the ram chamber 112. A valve, as a check valve 117, is interposed in said passageway 116 for permitting flow of plastic material from the reservoir 111 into the ram chamber 112 but preventing reverse flow. A piston 128 having therein a passageway and a valve, as a check valve 114, is reciprocated in the reservoir 111 by the rod 131. Any convenient means, not shown, controllably reciprocates the rod 131 in timed relationship to the reciprocation of the ram 110 to receive plasticized material from the pre-plasticizing unit 103 whenever the port 115 is blocked and drive it by the piston 128 through the valve 117 into the ram chamber 112 as desired whenever the passageway 116 is unblocked.

Figure 8 shows a further modification wherein the head of the reservoir plunger 28 is bolted by its guide 29 directly to the adjacent wall of the ram chamber for supporting same and holding it immovable with respect to said wall.

Other modifications and variations of the specific structure here shown will become apparent to persons acquainted with equipment of this general type but regardless of the exact form in which a particular embodiment is built, it will be recognized that I have disclosed apparatus by which the objects and purposes above set forth may be accomplished. Inasmuch as the invention may be carried out by a variety of forms, both as above specifically disclosed and others which will be apparent to persons acquainted with apparatus of this general type, the hereinafter appended claims should be construed broadly excepting as said claims by their own express terms require otherwise.

I claim:

1. An injection machine for plasticizing synthetic organic plastic material and injecting same into a mold, the combination comprising: means defining a ram chamber; a preplasticizing unit for plasticizing said synthetic organic plastic material; means within said ram defining a reservoir; a first passageway through the working face of said ram from said reservoir to said ram chamber and means associated with said first passageway permitting only unidirectional flow of material from within said reservoir into said ram chamber; a second passageway through the side of said ram chamber; a third pasageway through the side of said ram from said reservoir and in register with said second passageway, said third passageway being sufficiently elongated to provide a portion thereof in register with said second passageway during all positions of said ram; means providing communication between the discharge end of said preplasticizing unit and said second passageway; a reservoir plunger within said reservoir and relatively movable with respect to the walls thereof for moving material out therefrom when said reciprocable ram is in a position other than its fully extended position.

2. The combination of claim 1 wherein said reservoir plunger has a portion extending through said third passageway to a distance such that the radially outer surface of said portion comprises substantially a continuation of the peripheral surface of said ram; and means causing said reservoir plunger to reciprocate with respect to said ram.

3. An injection machine for plasticizing synthetic organic plastic material and injecting same into a mold, the combination comprising: means defining a ram chamber; a preplasticizing unit for plasticizing said synthetic organic plastic material; means within said ram defining a reservoir; a first passageway through the working face of said ram from said reservoir to said ram chamber and means associated with said first passageway permitting only unidirectional flow of material from within said reservoir into said ram chamber; a second passageway through the side of said ram chamber; a third passageway through the side of said ram from said reservoir and in register with said second passageway, said third passageway being sufficiently elongated longitudinally of said ram as to be in register with said second passageway during all positions of said ram; means providing communication between the discharge end of said preplasticizing unit and said second passageway; and a reservoir plunger within said reservoir and relatively movable with respect to the walls thereof for moving material out therefrom in a preselected portion of a molding cycle.

4. The combination of claim 3 including means for reciprocating said reservoir plunger relative to the walls of said reservoir and relative to the walls of said ram chamber.

5. An injection machine for plasticizing synthetic organic plastic material and injecting same into a mold, the combination comprising: means defining a ram chamber; a preplasticizing unit for plasticizing said synthetic organic plastic material; means within said ram defining a reservoir; a first passageway through the working face of said ram from said reservoir to said ram chamber and means associated with said first passageway permitting only unidirectional flow of material from within said reservoir into said ram chamber; a second passageway through the side of said ram chamber; a third passageway through the side of said ram from said reservoir and in register with said second passageway, said third passageway being sufficiently elongated longitudinally of said ram as to be in register with said second passageway during all positions of said ram; means providing communication between the discharge end of said preplasticizing unit and said second passageway; an auxiliary ram within said reservoir and means holding same fixed with respect to the walls defining said ram chamber.

6. An injection machine for plasticizing synthetic organic plastic material and injecting same into a mold, the combination comprising: means defining a ram chamber; a preplasticizing unit for plasticizing said synthetic organic plastic material; means within said ram defining a reservoir; a first passageway through the working face of said ram from said reservoir to said ram chamber and means associated with said first passageway permitting only unidirectional flow of material from within said reservoir into said ram chamber; a second passageway through the side of said ram chamber; a third passageway through the side of said ram from said reservoir and in register with said second passageway, said third passageway being sufficiently elongated longitudinally of said ram as to be in register with said second passageway during all positions of said ram; means providing communication between the discharge end of said preplasticizing unit and said second passageway; and a reservoir plunger within said reservoir and relatively movable with respect to the walls thereof for moving material out therefrom when said ram is in a position other than its fully extended position, said reservoir plunger extending longitudinally through said ram and being reciprocable with respect thereto for ejecting material from said reservoir; and means holding said reservoir plunger fixed with respect to the walls defining said ram chamber.

7. An injection machine for plasticizing synthetic organic plastic material and injecting same into a mold, the combination comprising: means defining a ram chamber; a reciprocable ram within said chamber; a preplasticizing unit for plasticizing said synthetic organic plastic material; means within said ram defining a reservoir; a first passageway through the working face of said ram from said reservoir to said ram chamber and means associated with said first passageway permitting only uni-directional flow of material from within said reservoir into said ram chamber; a second passageway through the side of said ram chamber; a third passageway through the side of said ram from said reservoir and in register with said second passageway, said third passageway being sufficiently elongated to provide a portion thereof in register with said second passageway during at least a substantial portion of the movement of the ram from its retracted position to its fully extended position; means providing communication between the discharge end of said preplasticizing unit and said second passageway; a reservoir plunger within said reservoir and relatively movable with respect to the walls thereof for moving material out therefrom when said reciprocable ram is in a position other than its fully extended position.

8. An injection machine for plasticizing synthetic organic plastic material and injecting same into a mold, the combination comprising: means defining a ram chamber; a reciprocable ram within said ram chamber; a preplasticizing unit for plasticizing said material; means within said ram defining a reservoir, said reservoir including a slot through a side wall of said ram and extending longitudinally thereof for a distance equal to the distance through which said ram moves; a first passageway through the working face of said ram from said reservoir to said ram chamber and valve means mounted in said first passageway; a second passageway through said ram from said reservoir; means providing communication between the discharge end of said preplasticizing unit and said second passageway; a reservoir plunger within said reservoir, said reservoir plunger having a guide portion extending through said slot and occupying substantially the entire cross-sectional area of said slot; and means securing said guide portion in fixed position on said means defining said ram chamber.

References Cited in the file of this patent

UNITED STATES PATENTS

| | | |
|---|---|---|
| 777,870 | Vellino | Dec. 20, 1904 |
| 856,026 | Brown et al. | June 4, 1907 |
| 2,159,559 | Lawyer | May 23, 1939 |
| 2,207,426 | Bailey | July 9, 1940 |
| 2,282,308 | Dahlin | May 12, 1942 |
| 2,359,840 | Goessling | Oct. 10, 1944 |
| 2,413,401 | Youngblood et al. | Dec. 31, 1946 |

FOREIGN PATENTS

| | | |
|---|---|---|
| 551,468 | Great Britain | Feb. 24, 1943 |
| 636,110 | Great Britain | Apr. 26, 1950 |